(12) United States Patent
Ichikawa et al.

(10) Patent No.: US 7,982,706 B2
(45) Date of Patent: Jul. 19, 2011

(54) BACKLIGHT DEVICE, METHOD OF DRIVING BACKLIGHT AND LIQUID CRYSTAL DISPLAY APPARATUS

(75) Inventors: Hiroaki Ichikawa, Kanagawa (JP); Kenichi Kikuchi, Kanagawa (JP); Kimio Hatajiri, Kanagawa (JP)

(73) Assignee: Sony Corporation (JP)

( * ) Notice: Subject to any disclaimer, the term of this patent is extended or adjusted under 35 U.S.C. 154(b) by 834 days.

(21) Appl. No.: 11/283,148

(22) Filed: Nov. 18, 2005

(65) Prior Publication Data

US 2006/0125773 A1 Jun. 15, 2006

(30) Foreign Application Priority Data

Nov. 19, 2004 (JP) ................................. 2004-336572
Aug. 10, 2005 (JP) ................................. 2005-232385

(51) Int. Cl.
*G09G 3/36* (2006.01)
(52) U.S. Cl. ............. 345/102; 345/87; 345/88; 345/204
(58) Field of Classification Search .................. 345/102, 345/690, 87–88, 204; 349/61–62
See application file for complete search history.

(56) References Cited

U.S. PATENT DOCUMENTS

| | | | |
|---|---|---|---|
| 6,411,046 B1 * | 6/2002 | Muthu | 315/309 |
| 6,441,558 B1 * | 8/2002 | Muthu et al. | 315/149 |
| 6,621,482 B2 | 9/2003 | Fuller | |
| 6,888,529 B2 * | 5/2005 | Bruning et al. | 345/102 |
| 7,199,771 B2 | 4/2007 | Yamazaki et al. | |
| 7,208,713 B2 * | 4/2007 | Ishiguchi | 250/205 |
| 7,439,941 B1 * | 10/2008 | Kumakura et al. | 345/60 |
| 7,511,695 B2 * | 3/2009 | Furukawa et al. | 345/102 |
| 7,656,371 B2 * | 2/2010 | Shimizu et al. | 345/83 |
| 7,888,623 B2 * | 2/2011 | Kawashima et al. | 250/205 |
| 2003/0011559 A1 * | 1/2003 | Adachi et al. | 345/102 |
| 2003/0214242 A1 | 11/2003 | Berg-johansen | |
| 2003/0230991 A1 | 12/2003 | Muthu et al. | |
| 2006/0022616 A1 * | 2/2006 | Furukawa et al. | 315/309 |
| 2006/0221047 A1 * | 10/2006 | Tanizoe et al. | 345/102 |

FOREIGN PATENT DOCUMENTS

| | | |
|---|---|---|
| EP | 1482770 | 12/2004 |
| JP | 10-049074 A | 2/1998 |

(Continued)

*Primary Examiner* — Alexander Eisen
*Assistant Examiner* — Jason M Mandeville
(74) *Attorney, Agent, or Firm* — Lerner, David, Littenberg, Krumholz & Mentlik, LLP (57) ABSTRACT

The present invention prevents extension of the time period from powering on a device to convergence of chromaticity of emitted white light on a certain chromaticity, irrespective of the temperature when the device is powered on. A color liquid crystal display apparatus includes a liquid crystal display unit, a backlight employing LEDs of red, green and blue as its light source, a drive unit for driving the LEDs of each color, a temperature sensor for sensing the temperature of the LEDs, and a chromaticity sensor for sensing the chromaticity of white light emitted from the LEDs. The drive unit supplies a current to the LEDs to drive them, and implements feedback control of the amount of current for the LEDs of each color based on a value sensed by the chromaticity sensor so that the white light has a certain chromaticity. Furthermore, upon powering on the backlight, the drive unit retrieves initial current values of the LEDs of each color from a non-volatile memory, and corrects the initial current values according to a value sensed by the temperature sensor to activate the LEDs of each color with the corrected value.

8 Claims, 10 Drawing Sheets

FOREIGN PATENT DOCUMENTS

| | | |
|---|---|---|
| JP | 2001-257921 A | 9/2001 |
| JP | 2001-272938 | 10/2001 |
| JP | 2002-189220 A | 7/2002 |
| JP | 2002-258792 A | 9/2002 |
| JP | 2004-193029 A | 7/2004 |
| WO | WO 03075617 A1 * | 9/2003 |

* cited by examiner

BACKLIGHT DEVICE, METHOD OF DRIVING BACKLIGHT AND LIQUID CRYSTAL DISPLAY APPARATUS

CROSS-REFERENCES TO RELATED APPLICATIONS

The present invention contains subject matter related to Japanese Patent Application JP 2004-336572 filed in the Japanese Patent Office on Nov. 19, 2004, and Japanese Patent Application JP 2005-232385 filed in the Japanese Patent Office on Aug. 10, 2005, the entire contents of which being incorporated herein by reference.

BACKGROUND OF THE INVENTION

The present invention relates to a backlight device provided on the backside of a non-emissive transmission display, a method of driving a backlight, and a liquid crystal display apparatus.

As a backlight of a liquid crystal panel, cold cathode fluorescent lamp (CCFL) type backlights employing fluorescent tubes have been the mainstream. However, needs for mercury-less products have been increasing on environmental grounds. These needs have raised expectations for light emission diodes (LEDs) as a light source replacing CCFLs in recent years. In particular, a method in which each of primary color LEDs of red, green and blue is individually used and the primary colors are optically subjected to additive color mixing to thereby obtain white light, is suitable for achieving a balance among the colors. Thus, it has been intensively studied to utilize this method for television use.

If LEDs are used as a light source of a backlight, a current applied to LEDs of one color must be independent of currents to LEDs of other colors since red, green and blue LEDs have different luminous efficiency. In addition, the semiconductor composition of an LED is different dependent on the color of the LED. Therefore, the voltage applied to an element and power consumption are also different for each color. Furthermore, when using LEDs as a light source of a backlight, it is impossible to individually drive the LEDs of each color in terms of actual costs (for example, refer to Japanese Paten Laid-open No. 2001-272938).

In such a backlight using red, green and blue LEDs as a light source, light rays of these colors must be optically synthesized at a certain ratio to thereby produce white light that invariably has a certain chromaticity. Therefore, photo sensors for red, green and blue are used to sense the luminous power of the corresponding color, and currents applied to the LEDs of the respective colors are adjusted by feedback control. Thus, red, green and blue light rays are synthesized at a certain ratio to adjust the resultant light into white light having a certain chromaticity.

However, if the speed of responses to such feedback control is high, the chromaticity frequently changes and these changes are easily recognized by a user. In order to avoid the disadvantage of the frequent chromaticity changes, typically the speed of responses to the feedback control is set low. Accordingly, at the time of powering on a backlight, chromaticity adjustment by such feedback control cannot be expected.

In such a backlight employing LEDs as a light source, therefore, the initial current amount (for example, the duty ratio of pulse width modulation (PWM)) is calculated in advance for each of red, green and blue, and the LEDs of each color are driven with the initial current amount immediately after powering up. These initial current amounts are calculated according to characteristics of the backlight prior to factory shipment thereof, for example. Adequate setting of these amounts can shorten the time period from powering up until convergence of chromaticity of emitted white light on a certain chromaticity.

If the initial current amounts are not adequately set and thus the time period until convergence on a certain chromaticity is long, a phenomenon arises in which initially a pink color is displayed on the screen and thereafter the color gradually approaches white.

SUMMARY OF THE INVENTION

When using LEDs as a light source of a backlight, a large number of LEDs are used. Therefore, a large difference exists between the temperature of the LEDs immediately after powering on the backlight and that in a stationary operation state (a state in which the temperature is constant). In addition, optical characteristics of an LED significantly vary depending on temperature. Therefore, optical characteristics of LEDs immediately after powering up are greatly different from those of the LEDs in a stationary operation state.

Accordingly, even if adequate initial amounts of current supplied to LEDs at the time of powering up are calculated in advance, the calculated values are not adequate values if the temperature at the powering up varies. This temperature variation precludes the shortening of the time period from powering up until convergence on a certain chromaticity.

The present invention is proposed in view of the above-described past circumstances, and an object thereof is to provide a backlight device that employs LEDs and is capable of preventing extension of a time period from powering on the device until convergence of chromaticity of emitted white light on a certain chromaticity irrespective of temperature at the time of the powering up, a method of driving a backlight, and a liquid crystal display apparatus.

An aspect of the present invention is to provide a backlight device having a plurality of light emitting diodes of at least three colors as a light source. The backlight device synthesizes light emitted from the light emitting diodes of each color to produce white light and emits the produced white light from a backside of a display unit. The backlight device includes a temperature sensor that senses temperature of the light source, and drive control means that supplies a current to the light emitting diodes of each color to drive the light emitting diodes. The backlight device also includes storage means that stores an initial current amount for the light emitting diodes of each color and a correction amount for the initial current amount. The correction amount depends on temperature. The drive control means calculates, upon powering on the backlight device, the correction amount based on a value sensed by the temperature sensor. The drive control means adds the calculated correction amount to the initial current amount of the light emitting diodes of each color and activates the light emitting diodes of each color with a corrected initial current amount.

Another aspect of the invention is to provide a backlight device having light emitting diodes of red, green and blue as a light source. The backlight device synthesizes light emitted from the light emitting diodes of each color to produce white light and emits the produced white light from a backside of a display unit. The backlight device includes a chromaticity sensor that senses a chromaticity of the white light, and a temperature sensor that senses temperature of the light source. The backlight device also includes drive control means that supplies a current to the light emitting diodes of each color to drive the light emitting diodes, and implements feedback control of an amount of a current to the light emitting diodes of each color based on a value sensed by the chromaticity sensor so that the white light has a certain chromaticity. The drive control means fixes an amount of a current flowing through the light emitting diodes of blue and adjusts amounts of currents flowing through the light emitting diodes of red and green to thereby implement the feedback control so that the white light has a certain chromaticity.

Still another aspect of the invention is to provide a method of driving a backlight device having a plurality of light emitting diodes of at least three colors as a light source. The backlight device synthesizes light emitted from the light emitting diodes of each color to produce white light and emits the produced white light from a backside of a display unit. The method includes the steps of storing an initial current amount for the light emitting diodes of each color and a correction amount for the initial current amount. The correction amount depends on temperature. The method also includes calculating, upon powering on the backlight device, the correction amount based on a value sensed by a temperature sensor that senses temperature of the light source, and adding the calculated correction amount to the initial current amount of the light emitting diodes of each color. The method further includes activating the light emitting diodes of each color with a corrected initial current amount, and implementing feedback control of an amount of a current to the light emitting diodes of each color based on a value sensed by a chromaticity sensor that senses a chromaticity of the white light so that the white light has a certain chromaticity.

A further aspect of the invention is to provide a method of driving a backlight device having light emitting diodes of red, green and blue as a light source. The backlight device synthesizes light emitted from the light emitting diodes of each color to produce white light and emits the produced white light from a backside of a display unit. The method includes the step of implementing feedback control of an amount of a current to the light emitting diodes of each color based on a value sensed by a chromaticity sensor that senses a chromaticity of the white light so that the white light has a certain chromaticity. An amount of a current flowing through the light emitting diodes of blue is fixed and amounts of currents flowing through the light emitting diodes of red and green are adjusted to thereby implement the feedback control so that the white light has a certain chromaticity.

A yet further aspect of the invention is to provide a liquid crystal display apparatus including a transparent color liquid crystal display panel and a backlight device that has a plurality of light emitting diodes of at least three colors as a light source. The backlight device synthesizes light emitted from the light emitting diodes of each color to produce white light. The transparent color liquid crystal display panel is irradiated with the produced white light from a backside of the transparent color liquid crystal display panel. The backlight device includes a temperature sensor that senses temperature of the light source, and a chromaticity sensor that senses a chromaticity of the white light. The backlight device also includes drive control means that supplies a current to the light emitting diodes of each color to drive the light emitting diodes, and storage means that stores an initial current amount for the light emitting diodes of each color and a correction amount for the initial current amount. The correction amount depends on temperature. The drive control means calculates, upon powering on the backlight device, the correction amount based on a value sensed by the temperature sensor. The drive control means then adds the calculated correction amount to the initial current amount of the light emitting diodes of each color and activates the light emitting diodes of each color with a corrected initial current amount. Thereafter, the drive control means implements feedback control of an amount of a current to the light emitting diodes of each color based on a value sensed by the chromaticity sensor so that the white light has a certain chromaticity.

A still further aspect of the invention is to provide a liquid crystal display apparatus including a transparent color liquid crystal display panel and a backlight device that has light emitting diodes of red, green and blue as a light source. The backlight device synthesizes light emitted from the light emitting diodes of each color to produce white light. The transparent color liquid crystal display panel is irradiated with the produced white light from a backside of the transparent color liquid crystal display panel. The backlight device includes a chromaticity sensor that senses a chromaticity of the white light, and a temperature sensor that senses temperature of the light source. The backlight device also includes drive control means that supplies a current to the light emitting diodes of each color to drive the light emitting diodes, and implements feedback control of an amount of a current to the light emitting diodes of each color based on a value sensed by the chromaticity sensor so that the white light has a certain chromaticity. The drive control means fixes an amount of a current flowing through the light emitting diodes of blue and adjusts amounts of currents flowing through the light emitting diodes of red and green to thereby implement the feedback control so that the white light has a certain chromaticity.

The aspects of the present invention can shorten the time period from powering on the backlight device to convergence of chromaticity of emitted white light on a certain chromaticity irrespective of the temperature when the device is powered up.

DETAILED DESCRIPTION

Embodiments of the present invention will be described in detail below with reference to the accompanying drawings.

Figure 1:
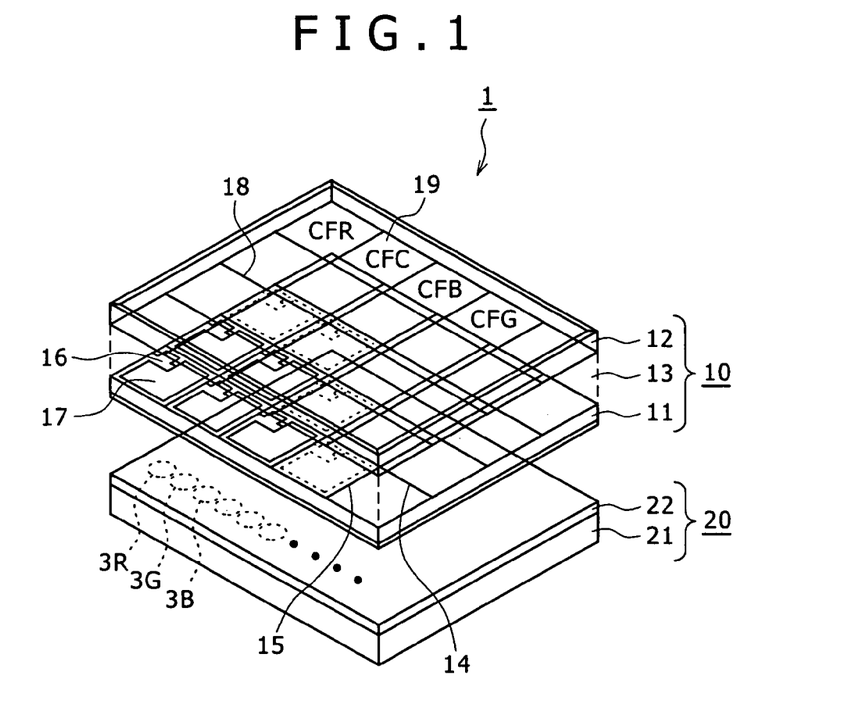
FIG. 1 is a schematic perspective view illustrating the configuration of a color liquid crystal display unit with a backlight system in a color liquid crystal display apparatus to which the present invention is applied.

The present invention is applied to a color liquid crystal display apparatus having a backlight type liquid crystal display unit 1 with a structure like that shown in FIG. 1, for example.

(Structure of Liquid Crystal Display Unit)

The liquid crystal display unit 1 includes a transparent color liquid crystal display panel 10 and a backlight device 20 provided on the backside of the color liquid crystal display panel 10.

(Panel)

The transparent color liquid crystal display panel 10 includes a TFT substrate 11, a counter electrode substrate 12 that face each other, and a liquid crystal layer 13 having, for example, twisted-nematic (TN) liquid crystal enclosed in a gap between the TFT substrates 11 and the counter electrode substrate 12. Formed on the TFT substrate 11 are signal lines 14, scan lines 15 that are disposed in a matrix, thin film transistors 16 as switching elements disposed at intersections between the signal lines 14 and the scan lines 15, and pixel electrodes 17. The thin film transistors 16 are sequentially selected by the scan lines 15, and write to the pixel electrodes 17 video signals supplied from the signal lines 14. On the inner surface of the counter electrode substrate 12, a counter electrode 18 and a color filter 19 are formed.

In the liquid crystal display unit 1, the transparent color liquid crystal display panel 10 having such a structure is interposed between two polarizing plates. The liquid crystal display unit 1 is driven by an active matrix method while the backlight device 20 emits white light from the backside of the color liquid crystal display panel 10, to thereby achieve desired full-color video displaying.

(Backlight)

The backlight device 20 includes a light source 21 and a wavelength selection filter 22. The backlight device 20 illuminates, from the backside of the color liquid crystal display panel 10 via the wavelength selection filter 22, the color liquid crystal display panel 10 with light emitted from the light source 21. Such a backlight device 20 is a directly-under type backlight, which is provided on the back surface of the transparent color liquid crystal display panel 10, and illuminates the color liquid crystal display panel 10 from directly under the back surface of the color liquid crystal display panel 10.

A large number of light emitting diodes (LEDs) 3 are provided in the light source 21 of the backlight device 20. The backlight device 20 outputs light emitted from the LEDs. Provided in the light source 21 are a large number of LEDs 3R for emitting red light, a large number of LEDs 3G for emitting green light, and a large number of LEDs 3B for emitting blue light. The light source 21 mixes the red, blue and green light rays to produce white light, and emits the white light to the color liquid crystal display panel 10.

The arrangement of the LEDs 3 in the light source 21 of the backlight device 20 is as follows, for example.

Figure 2:
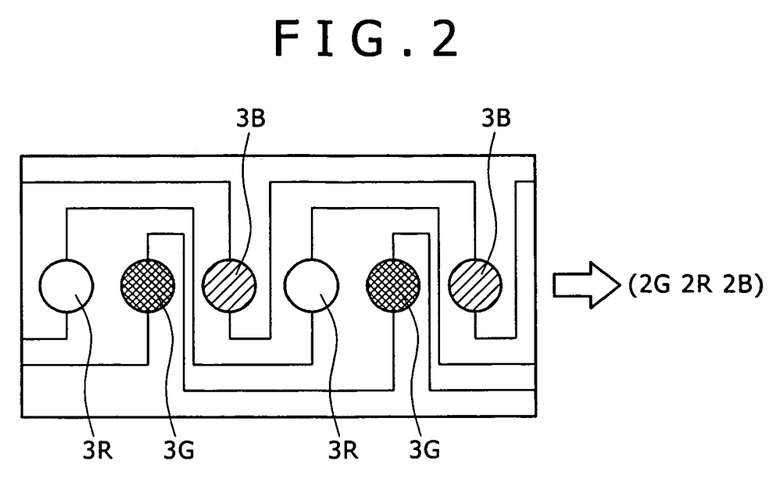
FIG. 2 is a diagram schematically illustrating, by means of pattern expression with light emitting diodes of each color, a unit cell obtained by using two red light emitting diodes, two green light emitting diodes and two blue light emitting diodes, and arranging the six light emitting diodes in series.
Figure 3:
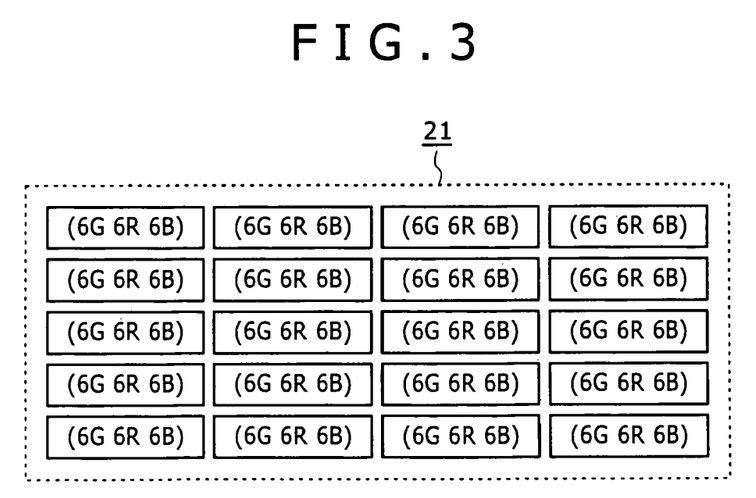
FIG. 3 is a diagram schematically illustrating an example of actual coupling of light emitting diodes in a light source 21 of a backlight device.

Initially, as shown in FIG. 2, two red LEDs 3R, two green LEDs 3G and two blue LEDs 3B are arranged. Specifically, the six LEDs are arranged in series to constitute a unit cell (2G 2R 2B). Subsequently, three unit cells (2G 2R 2B) are arranged laterally to constitute a medium unit cell (6G 6R 6B). The medium unit cells (6G 6R 6B) are coupled in series along the horizontal direction as shown in FIG. 3. Groups of the serially coupled cells are arranged across the vertical direction to cover the entire screen.

Such arrangement of the LEDs allows mixing of the three colors of light from the red, green and blue LEDs, and thus allows emission of well-balanced white light. The arrangement of the LEDs is not limited to that shown in FIGS. 2 and 3, but any arrangement is available as long as well-balanced color mixing is ensured.

(Entire Configuration of Color Liquid Crystal Display Apparatus)

Figure 4:
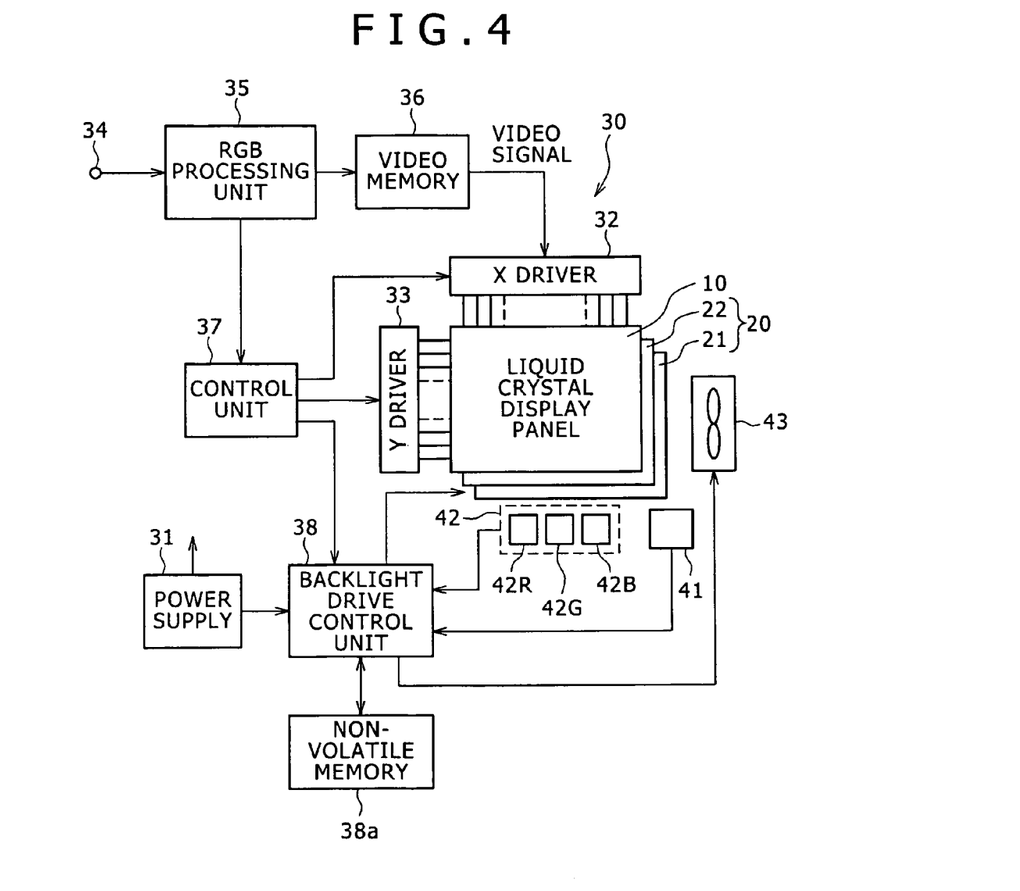
FIG. 4 is a block diagram illustrating the entire configuration of the color liquid crystal display apparatus.

FIG. 4 illustrates an example of the entire configuration of a color liquid crystal display apparatus 30. The color liquid crystal display apparatus 30 includes a power supply unit 31 for supplying a driving voltage of the color liquid crystal display panel 10 and the backlight device 20, an X driver 32 and a Y driver 33 that drive the color liquid crystal display panel 10. The color liquid crystal display apparatus 30 also includes an RGB processing unit 35 externally supplied with a video signal via an input terminal 34, a video memory 36, a control unit 37 that are coupled to the RGB processing unit 35, and a backlight drive control unit 38 for controlling the driving of the backlight device 20.

The video signal input via the input terminal 34 is subjected to signal processing, such as chroma processing, by the RGB processing unit 35. Furthermore, the signal is converted from a composite signal to an RGB separate signal adequate for driving of the color liquid crystal display panel 10, and then is supplied to the control unit 37, and to the X driver 32 via the video memory 36. The control unit 37 controls the X and Y drivers 32 and 33 at predetermined timing in accordance with the RGB separate signal, and thus drives the color liquid crystal display panel 10 with the RGB separate signal supplied via the video memory 36 to the X driver 32, to thereby display a video according to the RGB separate signal.

Figure 5:
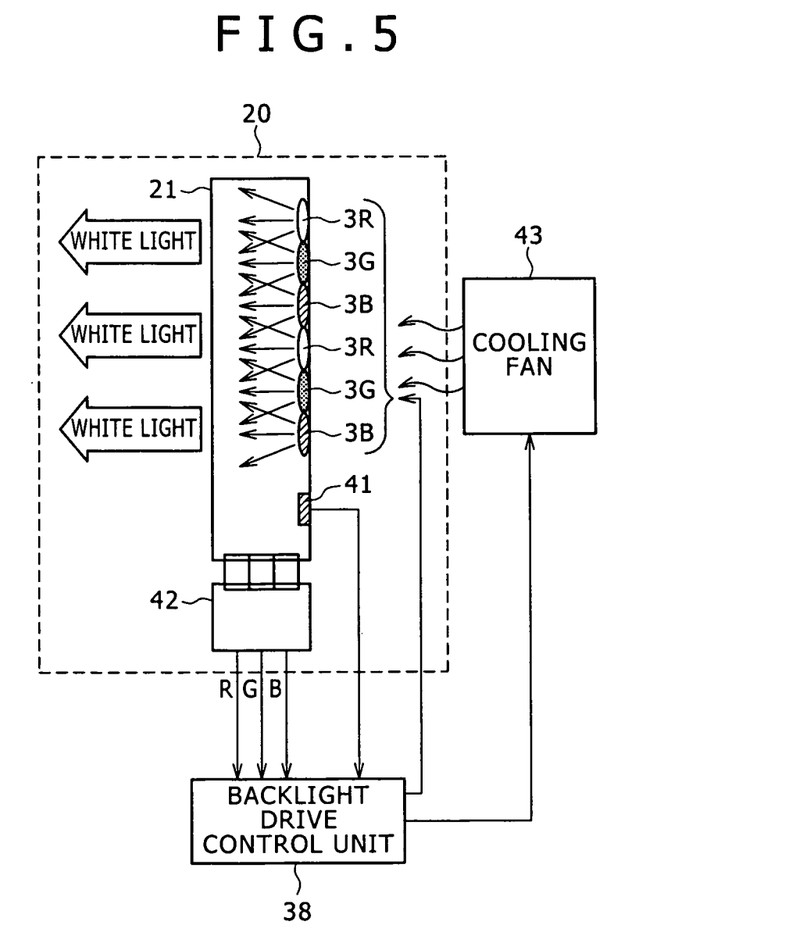
FIG. 5 is a diagram illustrating the backlight device, a sensor and a cooling fan that are provided for the backlight device.

In addition, as shown in FIGS. 4 and 5, the color liquid crystal display apparatus 30 includes a temperature sensor 41, a luminous power/chromaticity sensor 42, and a cooling fan 43 for lowering the temperature of the backlight device 20. The temperature sensor 41 senses the temperature of the light source 21 (LEDs) of the backlight device 20. The luminous power/chromaticity sensor 42 (42R, 42G, 42B) senses luminous power or chromaticity of light of each of R, G and B from the light source 21 (LEDs) of the backlight device 20.

The sensed values by the temperature sensor 41 and the luminous power/chromaticity sensor 42 are supplied to the backlight drive control unit 38. The backlight drive control unit 38 controls driving currents for the LEDs constituting the light source 21 based on the sensed values.

In addition, the backlight drive control unit 38 controls the rotation rate of the cooling fan 43 according to the temperature value sensed by the temperature sensor 41, to thereby control the temperature of the light source 21 (LEDs) of the backlight device 20.

Furthermore, the backlight drive control unit 38 internally has a non-volatile memory 38a. The non-volatile memory 38a stores various setting values.

(LED Driving Circuit)

Provided in the backlight drive control unit 38 are a plurality of LED driving circuits 50 for driving the light source 21 (LEDs) of the backlight device 20.

Figure 6:
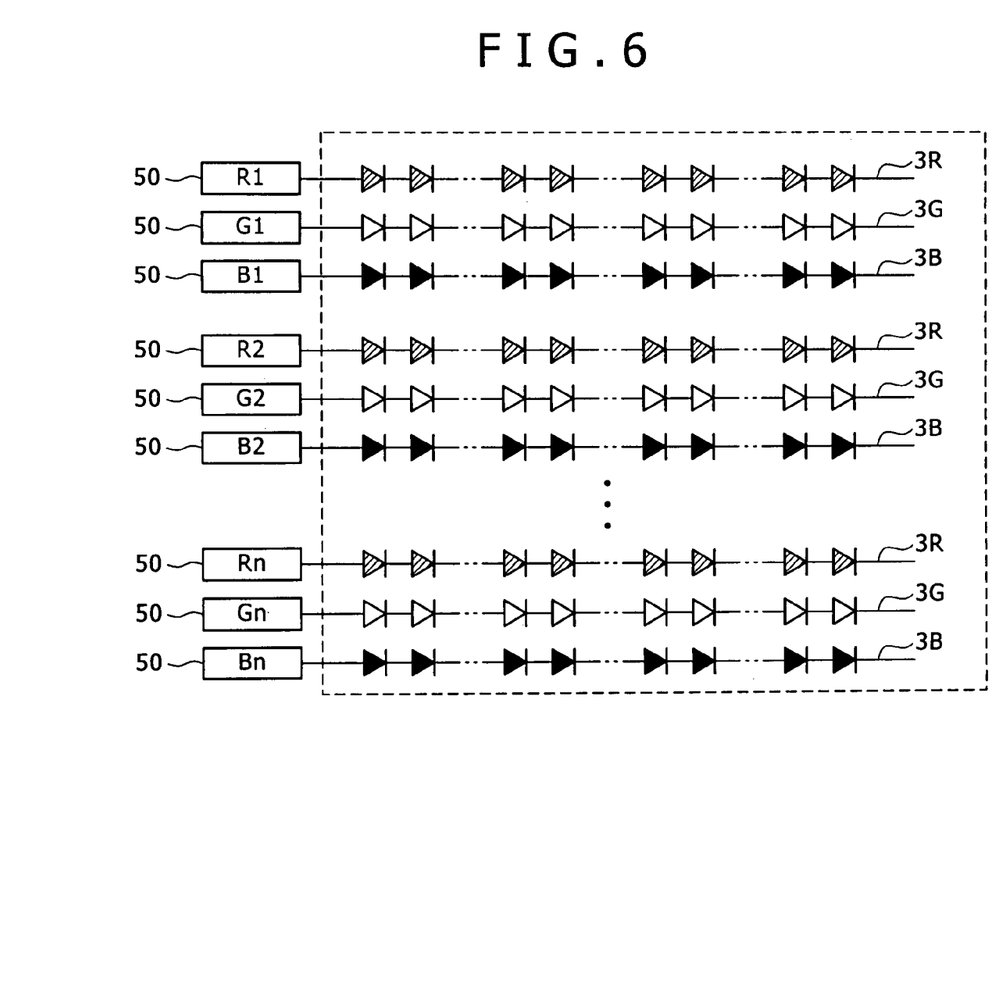
FIG. 6 is a diagram illustrating groups of light emitting diodes coupled in series along the horizontal direction and a plurality of LED driving circuits for driving each group of the light emitting diodes.

As shown in FIG. 6, the LEDs 3, which serve as a light source of the backlight device 20, of the same color arranged in the horizontal direction are electrically coupled to each other in series. Each LED driving circuit 50 is independently provided for a respective one of groups of the LEDs 3 serially coupled in the horizontal direction.

Figure 7:
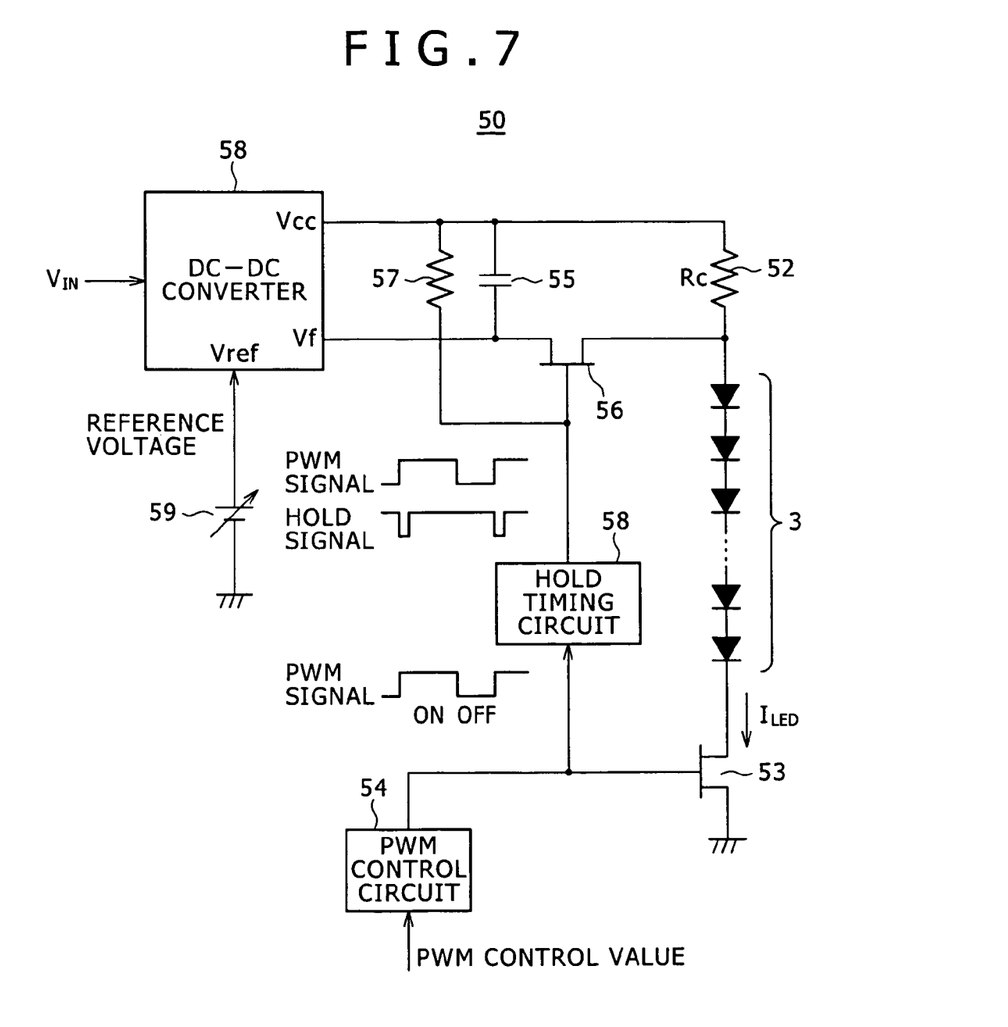
FIG. 7 is a block configuration diagram of the LED driving circuit.

FIG. 7 illustrates an example of the circuit configuration of the LED driving circuit 50 provided in the backlight drive control unit 38.

The LED driving circuit 50 includes a DC-DC converter 51, a constant resistor (Rc) 52, a field effect transistor (FET) 53, a PWM control circuit 54, a capacitor 55, a sample-and-hold FET 56, a resistor 57, a hold timing circuit 58 and a reference power supply 59.

The DC-DC converter 51 receives a DC voltage VIN generated from the power supply 31 shown in FIG. 4, and switches the received DC voltage to produce a stabilized DC output voltage Vcc. The DC-DC converter 51 produces such a stabilized output voltage Vcc that the potential difference between the voltage input from a feedback terminal Vf and the output voltage Vcc equals a reference voltage (Vref). The reference voltage (Vref) is supplied from the reference power supply 59.

The anodes of the serially coupled LEDs 3 are coupled via the constant resistor (Rc) to the output terminal of the output voltage Vcc of the DC-DC converter 51. The anodes of the serially coupled LEDs 3 are also coupled via the source and drain of the sample-and-hold FET 56 to the feedback terminal of the DC-DC converter 51. The cathodes of the serially coupled LEDs 3 are grounded via the source and drain of the FET 53.

Input to the gate of the FET 53 is a PWM signal generated from the PWM control circuit 54. The FET 53 is turned on when the PWM signal is ON, and is turned off when the PWM signal is OFF. Therefore, the FET 53 applies a current to the LEDs 3 when the PWM signal is ON, and applies no current to the LEDs 3 when the PWM signal is OFF. Specifically, the FET 53 causes the LEDs 3 to emit light when the PWM signal is ON, and stops the light emission of the LEDs 3 when the PWM signal is OFF.

The PWM control circuit 54 produces the PWM signal that is a binary signal for adjusting the duty ratio between an On time period and an OFF time period. The PWM control circuit 54 is supplied with a duty control value (PWM), and changes the duty ratio according to the control value (PWM).

The capacitor 55 is provided between the output terminal and the feedback terminal of the DC-DC converter 51. The resistor 57 is coupled to the output terminal of the DC-DC converter 51 and the gate of the sample-and-hold FET 56.

The hold timing circuit 58 receives the PWM signal and produces a hold signal. The hold signal is OFF during a certain time period at a rising edge of the PWM signal, and is ON during other time periods.

Input to the gate of the sample-and-hold FET 56 is the hold signal output from the hold timing circuit 58. The sample-and-hold FET 56 is turned on when the hold signal is OFF, and is turned off when the hold signal is ON.

In the above-described LED driving circuit 50, a current ILED flows through the LEDs 3 only during the period when the PWM signal generated from the PWM control circuit 54 is ON. The capacitor 55, the sample-and-hold FET 56 and the resistor 57 constitute a sample-and-hold circuit. The sample-and-hold circuit samples, when the PWM signal is ON, the voltage value at the anodes of the LEDs 3 (i.e., at one end of the constant resistor 52, not coupled to the output terminal of the voltage Vcc), and supplies the voltage value to the feedback terminal of the DC-DC converter 51. Since the DC-DC converter 51 stabilizes the output voltage Vcc based on the voltage value input to the feedback terminal, the peak value of the current ILED flowing through the constant resistor Rc 52 and the LEDs 3 is kept constant.

Therefore, in the LED driving circuit 50, pulse driving according to the PWM signal is implemented while the peak value of the current ILED flowing through the LEDs 3 is kept constant.

In this circuit, the amount of current flowing through the LEDs 3 is adjusted by changing the control value (PWM). However, the peak value of the current flowing through the LEDs 3 may be adjusted by changing the reference voltage (Vref) applied to the DC-DC converter 51. Alternatively, a combination of these changes may be used.

(Control Method for Keeping Chromaticity Constant)

Description will be made about a control method for causing the chromaticity of white light emitted from the backlight device 20 to converge on a specific chromaticity and be stabilized.

Upon powering on the backlight device 20 and emission of white light from the backlight device 20, the backlight drive control unit 38 controls so that luminous power ratio among the red LEDs 3R, the green LEDs 3G and the blue LEDs 3B becomes a specific ratio, to thereby stabilize the chromaticity of white light emitted from the backlight device 20 at a specific chromaticity.

Figure 8:
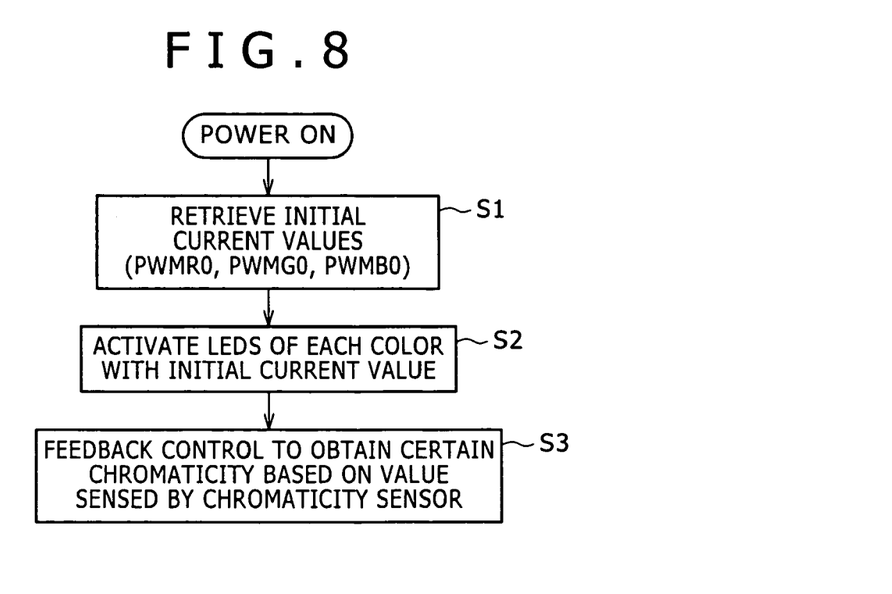
FIG. 8 is a flowchart of control processing for causing the chromaticity of white light to converge on a certain chromaticity and be stabilized thereat.

Specifically, this control is implemented in accordance with the flowchart shown in FIG. 8.

Initially, in a step S1, upon powering on the backlight device 20, the backlight drive control unit 38 retrieves initial current values (PWMR0, PWMG0, and PWMB0) stored in the non-volatile memory 38a, and then activates the red LEDs 3R, the green LEDs 3G and the blue LEDs 3B with the respective initial current values.

The non-volatile memory 38a stores, as the initial current values, the initial current value PWMR0 for driving the red LEDs 3R, the initial current value PWMG0 for driving the green LEDs 3G and the initial current value PWMB0 for driving the LEDs 3B that are independently of each other. The LEDs 3 are driven by PWM control in the present example. Therefore, the duty ratios of the PWM control are stored as the initial current values. If this circuit is to control the current amounts by changing the peak values of currents, the peak values are stored as the initial current values.

Subsequently, in a step S2, the backlight drive control unit 38 initializes driving of the LEDs 3 of each color with the retrieved initial current values (PWMR0, PWMG0, and PWMB0). Upon start of the driving of the LEDs 3, light is emitted from the backlight device 20.

Subsequently, in a step S3, the backlight drive control unit 38 implements feedback control of driving currents (PWM duty ratios) for the red, green and blue LEDs 3R, 3G and 3B according to outputs of sensed values from the luminous power/chromaticity sensor 42, so that white light (synthetic light of red, green and blue) emitted from the backlight device 20 has a certain chromaticity.

Specifically, the control is implemented so that PhtR:PhtG:PhtB is constant in which PhtR, PhtG and PhtB are luminous power of red, green and blue light, respectively, sensed by the luminous power/chromaticity sensor 42.

(Reason for Implementing Control Based on Blue Light)

When implementing the feedback control for keeping chromaticity constant, three kinds of current amounts (the amounts of currents flowing through the red, green and blue LEDs) must be adjusted simultaneously, which greatly complicates the processing. Therefore, in the backlight drive control unit 38, the value of current flowing through the blue LEDs 3B is constantly fixed while currents flowing through the LEDs of other colors (i.e., red and green) 3R and 3G are varied, to thereby allow adjustment for keeping chromaticity constant.

By thus fixing the current flowing through the blue (B) LEDs, parameters to be used in various computations for the feedback control can be defined more simply. Specifically, for the blue (B) LEDs, the parameter can always be "1", and for the red (R) and green (G) LEDs, the ratios with respect to the blue (B) LEDs can be used as the parameters therefor.

Thus, the number of variables to be treated can be reduced to two, which significantly simplifies the arithmetic processing.

The reason why, of the amounts of currents to the LEDs, the amount of current to the blue LEDs 3B is fixed is as follows.

Figure 9:
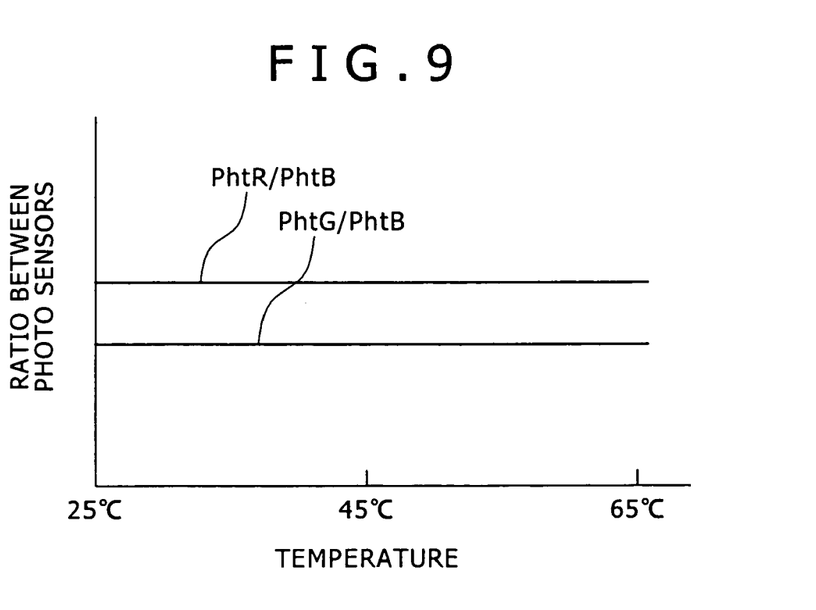
FIG. 9 is a diagram illustrating ratios of luminous power values sensed by a luminous power/chromaticity sensor based on the luminous power of the blue LEDs (PhtG/PhtB and PhtR/PhtB) obtained when optical characteristics of the LEDs are constant irrespective of temperature.

If the optical characteristics of the LEDs are constant irrespective of temperature, the ratios of luminous power values based on the luminous power of the blue LEDs (PhtG/PhtB and PhtR/PhtB), sensed by the luminous power/chromaticity sensor 42, are also constant irrespective of temperature as shown in FIG. 9.

However, actually, the optical characteristics of the LEDs greatly vary depending on temperature.

Figure 10:
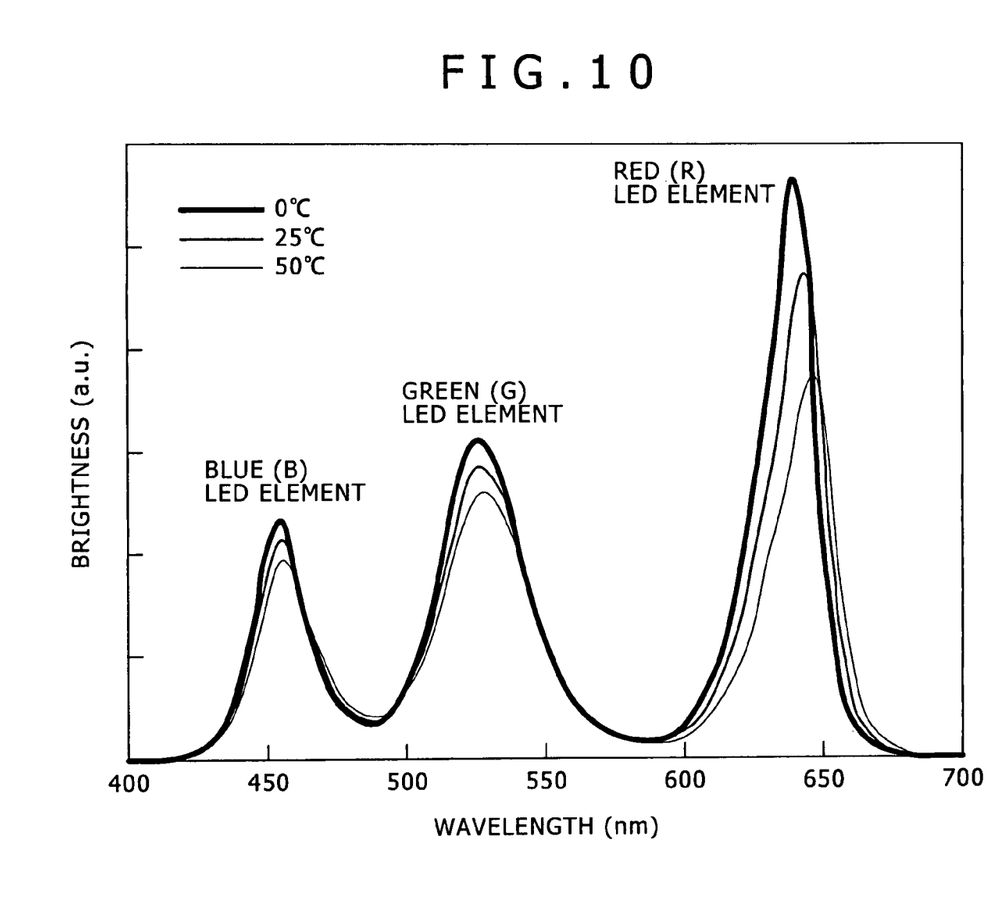
FIG. 10 is a diagram illustrating brightness of each of red (R), green (G) and blue (B) LED elements as a function of wavelength of emitted light therefrom.

For example, FIG. 10 is a graph showing brightness of each of red (R), green (G) and blue (B) LED elements as a function of wavelength of emitted light therefrom. The graph of FIG. 10 illustrates brightness distributions found when temperature is 0° C., 25° C. and 50° C., respectively. In the graph of FIG. 10, wavelengths of emitted light are plotted on the x-axis while luminous output (brightness) on the y-axis.

As is apparent from FIG. 10, the luminous power (the area of part surround by the curve) of each LED element varies depending on temperature. In addition, a higher temperature shifts the luminous power curve toward a higher wavelength. In the red (R) LED element in particular, a higher temperature significantly shifts the wavelength corresponding to the brightness peak (peak wavelength) toward a higher wavelength.

Therefore, in the feedback control for keeping constant chromaticity, precise control is not allowed unless temperature characteristics are also taken into consideration.

Figure 11:
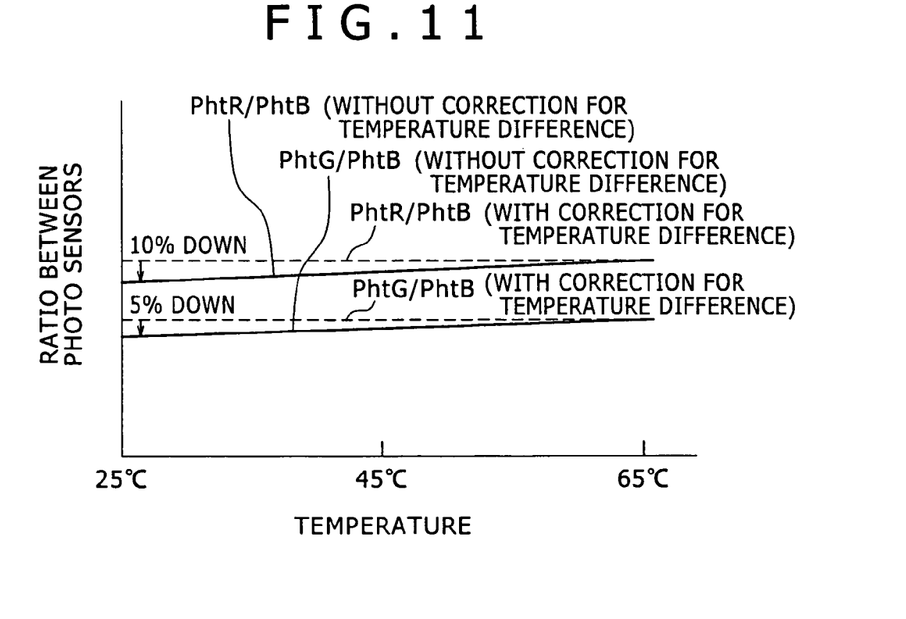
FIG. 11 is a diagram illustrating sensed outputs from the chromaticity sensor as a function of temperature.

The backlight drive control unit 38 therefore implements not only control based on sensed outputs from the luminous power/chromaticity sensor 42 but also correction according to sensed outputs from the temperature sensor 41. Such control in consideration for temperature allows stabilized chromaticity as shown in FIG. 11.

When the correction relating to temperature is thus also implemented, stable feedback control is allowed if the correction processing is implemented based on the color involving the smallest luminous power changes against temperature changes. In contrast, if a color involving large luminous power changes against temperature changes is used as a reference, the reference value easily varies depending on temperature, which makes it difficult to implement stable feedback control.

Referring to the graph of FIG. 10, the blue LEDs have the smallest wavelength shifts and the smallest peak value changes against temperature changes.

Thus, the backlight drive control unit 38 implements control with fixing the current amount for the blue LEDs 3B.

(Temperature Offset at Powering on Backlight)

In addition, the backlight drive control unit 38 corrects the initial current values (PWMR0, PWMG0, and PWMB0) at the time of powering on the backlight device according to the temperature sensed by the temperature sensor 41.

Figure 12:
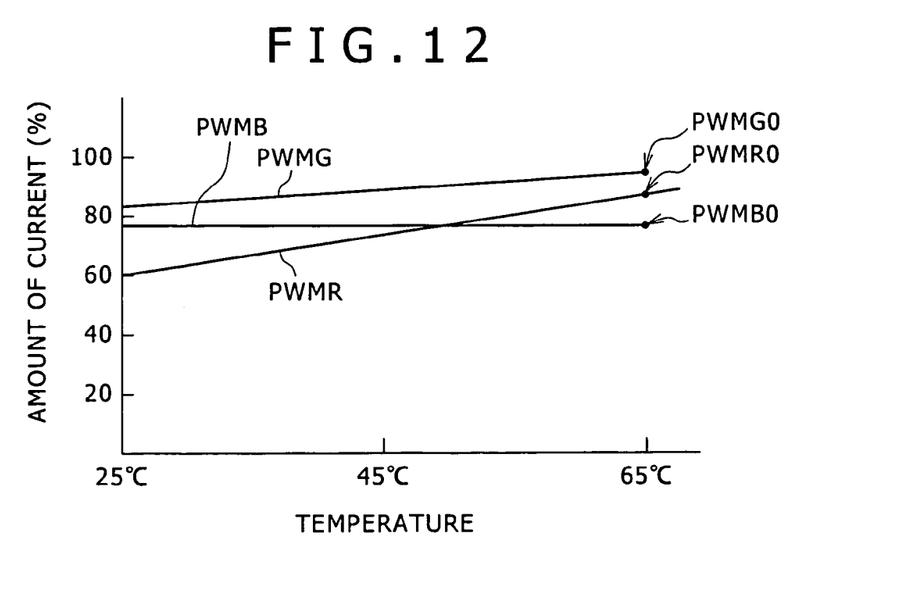
FIG. 12 is a diagram illustrating amounts of current for obtaining a certain chromaticity as a function of temperature.

If the feedback control for keeping chromaticity constant is implemented, the temperature characteristic of current amount (the duty of PWM) for each LED is illustrated by FIG. 12.

Figure 13:
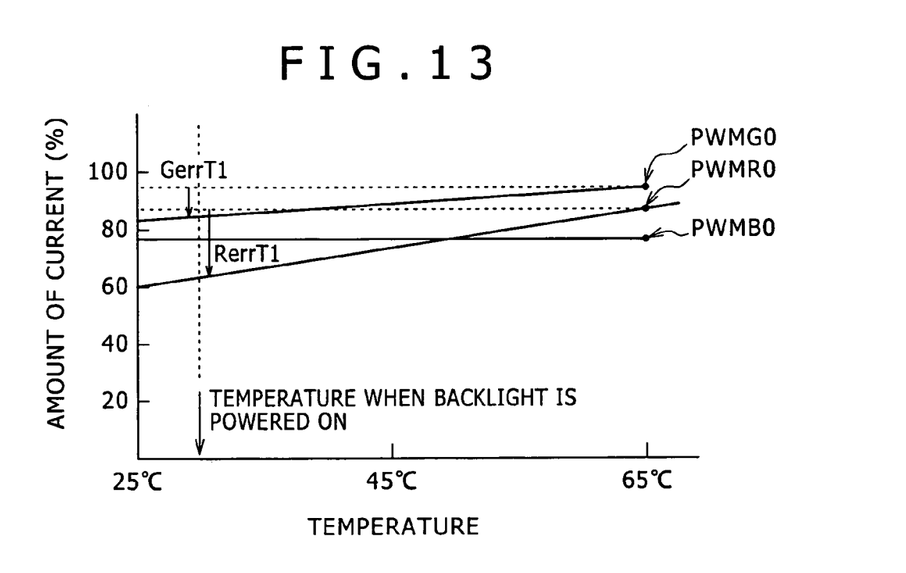
FIG. 13 is a diagram illustrating differences between amounts of current for obtaining a certain chromaticity when the backlight device is powered up and initial current amounts.

If the initial current values (PWMR0, PWMG0, and PWMB0) are defined based on optimum values obtained when temperature is 65° C. for example, when temperature is 30° C., the red and green LEDs involve the differences of about −20% (Rerr) and −10% (Gerr) relative to the initial values, respectively, as shown in FIG. 13. The blue LEDs do not involve this difference since the driving current (PWM duty) for the blue LEDs is controlled to be constant. Therefore, the temperature when the backlight device 20 is powered up is 30° C. for example, the feedback control must adjust the current values for these differences (Rerr and Gerr) to achieve the convergence of the chromaticity.

However, since these differences are comparatively large, a time period it takes for the chromaticity to converge is long. If the time period until the convergence is long, the red LEDs, which involve large differences, have effect on the image quality, and therefore a gradual color change from pink to white (white having an aimed chromaticity) is visually recognized.

In order to solve this problem, with taking into consideration the temperature (a value sensed by the temperature sensor 41) when the backlight device 20 is powered up, the backlight drive control unit 38 corrects the initial values (PWMR0 and PWMG0) retrieved from the non-volatile memory 38a in accordance with the following Equation 1, for example, and supplies the corrected value as a driving current to each LED.

$$PWMRt = \frac{DrT1 \times PWMR0}{T0 - T1} \times T + \left(1 - \frac{T0}{T0 - T1} \times DrT1\right) \times PWMR0$$

$$PWMGt = \frac{DgT1 \times PWMG0}{T0 - T1} \times T + \left(1 - \frac{T0}{T0 - T1} \times DgT1\right) \times PWMG0$$

Equation 1

Where $$DrT1 = RerrT1 / PWMR0$$

$$DgT1 = GerrT1 / PWMG0$$

Each parameter in Equation 1 is defined as follows.

PWMRt: current amount set for red LEDs (current value after correction)

PWMGt: current amount set for green LEDs (current value after correction)

T0: temperature (for example, 65° C.) when initial current values (PWMR0, PWMG0, and PWMB0) are calculated T1: any temperature T: present temperature of the backlight device 20 sensed by the temperature sensor 41.

RerrT1: current value difference of the red LEDs when temperature is Ti (i.e., value obtained by subtracting, from PWMR0, the current amount for the red LEDs when the chromaticity of emitted light has converged on a certain chromaticity at the temperature T1)

GerrT1: current value difference of the green LEDs when temperature is T1 (i.e., value obtained by subtracting, from PWMG0, the current amount for the green LEDs when the chromaticity of emitted light has converged on a certain chromaticity at the temperature T1)

By correcting the initial current amounts as described above, the amount of the initially applied current can be brought closer to the convergence value, which can shorten the time period until the convergence (time period until emitted light is stabilized to white light having a certain chromaticity).

Note that RerrT1 and GerrT1 are calculated in advance and stored in the non-volatile memory 38a prior to factory shipment of the backlight device 20. RerrT1 and GerrT1 may be calculated for each backlight device 20. Alternatively, for example, theoretically calculated values may be stored in consideration of productivity.

While a preferred embodiment of the present invention has been described using specific terms, such description is for illustrative purposes only, and it is to be understood that changes and variations may be made without departing from the spirit or scope of the following claims.

The invention claimed is:

1. A backlight device having a plurality of light emitting diodes of at least three colors as a light source, the backlight device synthesizing light emitted from the light emitting diodes of each color to produce white light and emitting the produced white light from a backside of a display unit, the backlight device comprising:

a temperature sensor that senses temperature of the light source;

drive control means that supplies a current to the light emitting diodes of each color to drive the light emitting diodes; and storage means that stores an initial current amount for the light emitting diodes of each color and a correction amount for the initial current amount, the correction amount depending on temperature, wherein the drive control means calculates, upon powering on the backlight device, the correction amount based on a value sensed by the temperature sensor, the drive control means adding the calculated correction amount to the initial current amount of the light emitting diodes of each color and activating the light emitting diodes of each color with a corrected initial current amount, the light emitting diodes as the light source are light emitting diodes of red, green and blue, and the drive control means implements feedback control, based on chromaticity of the white light using the light emitting diodes of blue as a reference, such that an amount of current flowing through the light emitting diodes of blue is fixed at a constant value while amounts of currents flowing through the light emitting diodes of red and green are varied, so that the white light has a certain chromaticity, wherein the constant value is the corrected initial current amount with which the light emitting diodes of blue are activated, and the corrected initial current amounts with which the light emitting diodes of red and green are activated are based on respective current value differences of the light emitting diodes of red and green and a sensed temperature of the light source, wherein the current value difference of the light emitting diodes of red is determined by subtracting, from the initial current amount for the light emitting diodes of red obtained at a predetermined temperature, a current amount for the light emitting diodes of red when the chromaticity of the emitted light is the certain chromaticity at a different predetermined temperature, and the current value difference of the light emitting diodes of green is determined by subtracting, from the initial current amount for the light emitting diodes of green obtained at the predetermined temperature, a current amount for the light emitting diodes of green when the chromaticity of the emitted light is the certain chromaticity at the different predetermined temperature.

2. The backlight device according to claim 1, further comprising:

a chromaticity sensor that senses a chromaticity of the white light, wherein the drive control means implements the feedback control based on a value sensed by the chromaticity sensor.

3. The backlight device according to claim 1, wherein the drive control means controls luminous power of the light emitting diodes by pulse width modulation control, the backlight device adjusting a duty ratio of the pulse width modulation control to thereby adjust an amount of a current supplied to the light emitting diodes.

4. A backlight device having light emitting diodes of red, green and blue as a light source, the backlight device synthesizing light emitted from the light emitting diodes of each color to produce white light and emitting the produced white light from a backside of a display unit, the backlight device comprising:

a chromaticity sensor that senses a chromaticity of the white light;

a temperature sensor that senses temperature of the light source; and drive control means that supplies a current to the light emitting diodes of each color to drive the light emitting diodes, and implements, using the light emitting diodes of blue as a reference, feedback control of an amount of a current to the light emitting diodes of each color based on a value sensed by the chromaticity sensor so that the white light has a certain chromaticity, wherein the drive control means, when implementing the feedback control, based on chromaticity of the white light fixes an amount of a current flowing through the light emitting diodes of blue at a constant value while adjusting amounts of currents flowing through the light emitting diodes of red and green, so that the white light has the certain chromaticity, wherein the constant value is an amount of current flowing through the light emitting diodes of blue when the light emitting diodes of blue are activated, and the amounts of current flowing through the light emitting diodes of red and green when the light emitting diodes of red and green are activated are based on respective current value differences of the light emitting diodes of red and green and a sensed temperature of the light source, wherein the current value difference of the light emitting diodes of red is determined by subtracting, from an initial current amount for the light emitting diodes of red obtained at a predetermined temperature, a current amount for the light emitting diodes of red when the chromaticity of the emitted light is the certain chromaticity at a different predetermined temperature, and the current value difference of the light emitting diodes of green is determined by subtracting, from an initial current amount for the light emitting diodes of green obtained at the predetermined temperature, a current amount for the light emitting diodes of green when the chromaticity of the emitted light is the certain chromaticity at the different predetermined temperature.

5. A method of driving a backlight device, the backlight device having a plurality of light emitting diodes of at least three colors as a light source, the light emitting diodes as the light source in the backlight device are light emitting diodes of red, green and blue, the backlight device synthesizing light emitted from the light emitting diodes of each color to produce white light and emitting the produced white light from a backside of a display unit, the method comprising the steps of:

storing an initial current amount for the light emitting diodes of each color and a correction amount for the initial current amount, the correction amount depending on temperature;

calculating, upon powering on the backlight device, the correction amount based on a value sensed by a temperature sensor that senses temperature of the light source;

adding the calculated correction amount to the initial current amount of the light emitting diodes of each color;

activating the light emitting diodes of each color with a corrected initial current amount; and     implementing feedback control, based on chromaticity of the white light using the light emitting diodes of blue as a reference, such that an amount of current flowing through the light emitting diodes of blue is fixed at a constant value while amounts of currents flowing through the light emitting diodes of red and green are varied, so that the white light has a certain chromaticity, wherein the constant value is the corrected initial current amount with which the light emitting diodes of blue are activated, and the corrected initial current amounts with which the light emitting diodes of red and green are activated are based on respective current value differences of the light emitting diodes of red and green and a sensed temperature of the light source,     wherein the current value difference of the light emitting diodes of red is determined by subtracting, from the initial current amount for the light emitting diodes of red obtained at a predetermined temperature, a current amount for the light emitting diodes of red when the chromaticity of the emitted light is the certain chromaticity at a different predetermined temperature, and     the current value difference of the light emitting diodes of green is determined by subtracting, from the initial current amount for the light emitting diodes of green obtained at the predetermined temperature, a current amount for the light emitting diodes of green when the chromaticity of the emitted light is the certain chromaticity at the different predetermined temperature.

6. A method of driving a backlight device, the backlight device having light emitting diodes of red, green and blue as a light source, the backlight device synthesizing light emitted from the light emitting diodes of each color to produce white light and emitting the produced white light from a backside of a display unit, the method comprising step of:

implementing, using the light emitting diodes of blue as a reference, feedback control of an amount of a current to the light emitting diodes of each color based on a value sensed by a chromaticity sensor that senses a chromaticity of the white light so that the white light has a certain chromaticity, wherein     an amount of a current flowing through the light emitting diodes of blue is fixed at a constant value while amounts of currents flowing through the light emitting diodes of red and green are adjusted when implementing the feedback control based on chromaticity of the white light, so that the white light has the certain chromaticity, wherein the constant value is an amount of current flowing through the light emitting diodes of blue when the light emitting diodes of blue are activated, and the amounts of current flowing through the light emitting diodes of red and green when the light emitting diodes of red and green are activated are based on respective current value differences of the light emitting diodes of red and green and a sensed temperature of the light source,     wherein the current value difference of the light emitting diodes of red is determined by subtracting, from an initial current amount for the light emitting diodes of red obtained at a predetermined temperature, a current amount for the light emitting diodes of red when the chromaticity of the emitted light is the certain chromaticity at a different predetermined temperature, and     the current value difference of the light emitting diodes of green is determined by subtracting, from an initial current amount for the light emitting diodes of green obtained at the predetermined temperature, a current amount for the light emitting diodes of green when the chromaticity of the emitted light is the certain chromaticity at the different predetermined temperature.

7. A liquid crystal display apparatus including a backlight device and a transparent color liquid crystal display panel, the backlight device having a plurality of light emitting diodes of at least three colors as a light source and synthesizing light emitted from the light emitting diodes of each color to produce white light, the light emitting diodes as the light source in the backlight device are light emitting diodes of red, green and blue, the transparent color liquid crystal display panel being irradiated with the produced white light from a backside of the transparent color liquid crystal display panel, the backlight device comprising:

a temperature sensor that senses temperature of the light source;

a chromaticity sensor that senses a chromaticity of the white light;

drive control means that supplies a current to the light emitting diodes of each color to drive the light emitting diodes; and     storage means that stores an initial current amount for the light emitting diodes of each color and a correction amount for the initial current amount, the correction amount depending on temperature, wherein:

the drive control means calculates, upon powering on the backlight device, the correction amount based on a value sensed by the temperature sensor, the drive control means adding the calculated correction amount to the initial current amount of the light emitting diodes of each color and activating the light emitting diodes of each color with a corrected initial current amount; and     the drive control means implements feedback control, based on chromaticity of the white light using the light emitting diodes of blue as a reference, based on a value sensed by the chromaticity sensor such that an amount of current flowing through the light emitting diodes of blue is fixed at a constant value while amounts of currents flowing through the light emitting diodes of red and green are varied, so that the white light has a certain chromaticity, wherein the constant value is the corrected initial current amount with which the light emitting diodes of blue are activated, and the corrected initial current amounts with which the light emitting diodes of red and green are activated are based on respective current value differences of the light emitting diodes of red and green and a sensed temperature of the light source, wherein the current value difference of the light emitting diodes of red is determined by subtracting, from the initial current amount for the light emitting diodes of red obtained at a predetermined temperature, a current amount for the light emitting diodes of red when the chromaticity of the emitted light is the certain chromaticity at a different predetermined temperature, and the current value difference of the light emitting diodes of green is determined by subtracting, from the initial current amount for the light emitting diodes of green obtained at the predetermined temperature, a current amount for the light emitting diodes of green when the chromaticity of the emitted light is the certain chromaticity at the different predetermined temperature.

8. A liquid crystal display apparatus including a backlight device and a transparent color liquid crystal display panel, the backlight device having light emitting diodes of red, green and blue as a light source and synthesizing light emitted from the light emitting diodes of each color to produce white light, the transparent color liquid crystal display panel being irradiated with the produced white light from a backside of the transparent color liquid crystal display panel, the backlight device comprising:

a chromaticity sensor that senses a chromaticity of the white light;

a temperature sensor that senses temperature of the light source; and drive control means that supplies a current to the light emitting diodes of each color to drive the light emitting diodes, and implements, using the light emitting diodes of blue as a reference, feedback control of an amount of a current to the light emitting diodes of each color based on a value sensed by the chromaticity sensor so that the white light has a certain chromaticity, wherein the drive control means, when implementing the feedback control, based on chromaticity of the white light fixes an amount of a current flowing through the light emitting diodes of blue at a constant value while adjusting amounts of currents flowing through the light emitting diodes of red and green, so that the white light has the certain chromaticity, wherein the constant value is an amount of current flowing through the light emitting diodes of blue when the light emitting diodes of blue are activated, and the amounts of current flowing through the light emitting diodes of red and green when the light emitting diodes of red and green are activated are based on respective current value differences of the light emitting diodes of red and green and a sensed temperature of the light source, wherein the current value difference of the light emitting diodes of red is determined by subtracting, from an initial current amount for the light emitting diodes of red obtained at a predetermined temperature, a current amount for the light emitting diodes of red when the chromaticity of the emitted light is the certain chromaticity at a different predetermined temperature, and the current value difference of the light emitting diodes of green is determined by subtracting, from an initial current amount for the light emitting diodes of green obtained at the predetermined temperature, a current amount for the light emitting diodes of green when the chromaticity of the emitted light is the certain chromaticity at the different predetermined temperature.

\* \* \* \* \*